Feb. 10, 1925.

G. H. BENZON, JR 1,525,793

DRIVE FOR MACHINE TOOLS

Filed Aug. 24, 1922      4 Sheets-Sheet 3

WITNESS:
Rob R Kitchel

INVENTOR
George H. Benzon, Jr.
BY
Frank S. Busser
ATTORNEY.

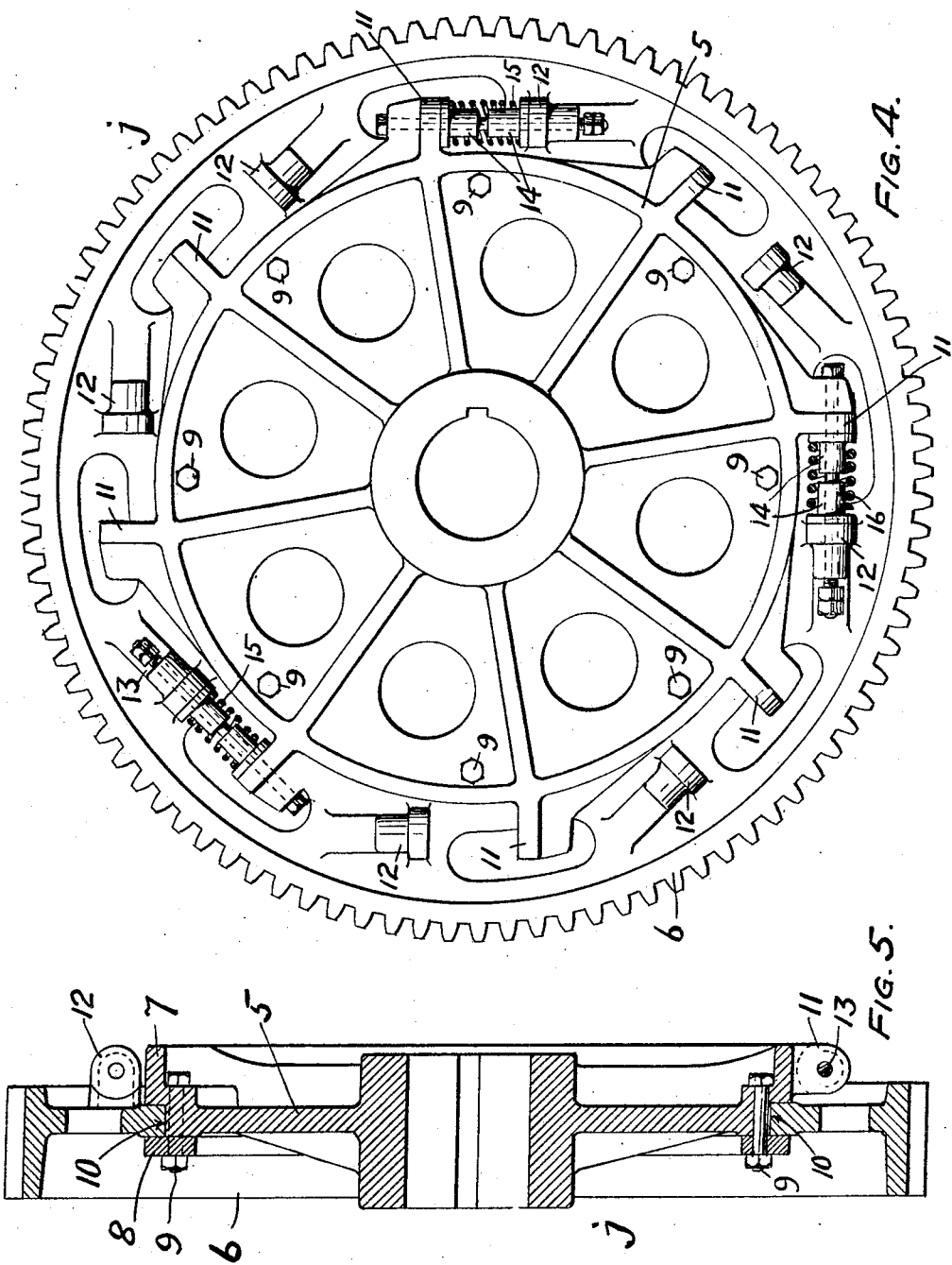

Patented Feb. 10, 1925.

1,525,793

UNITED STATES PATENT OFFICE.

GEORGE H. BENZON, JR., OF JENKINTOWN, PENNSYLVANIA, ASSIGNOR TO WILLIAM SELLERS & COMPANY, INCORPORATED, OF PHILADELPHIA, PENNSYLVANIA, A CORPORATION OF PENNSYLVANIA.

DRIVE FOR MACHINE TOOLS.

Application filed August 24, 1922. Serial No. 583,980.

*To all whom it may concern:*

Be it known that I, GEORGE H. BENZON, Jr., a citizen of the United States, residing at Jenkintown, county of Montgomery, and State of Pennsylvania, have invented a new and useful Improvement in Drives for Machine Tools, of which the following is a full, clear, and exact description, reference being had to the accompanying drawings, which form a part of this specification.

This invention relates to an improvement in driving mechanism for machine tools.

It is well known to those familiar with the operations of machine tools that chatter is frequently set up when the tool is making a cut, which may be attributed to various causes. This chatter is not only very annoying, but may also be a contributing cause of irregularities in the work done by the machine tool.

While chatter is common in machine tools generally, its occurrence is especially pronounced in locomotive driving wheel lathes, and particularly when relatively light finishing cuts are made with broad faced tools, such as are used to simultaneously finish, by means of radially moving cutters, the flanges of the wheels and at least a portion of the tread, or that portion of the tread of such wheels beyond the tread proper, or the rail engaging portion. Driving wheels of this character are pressed onto their axles before the rims are turned, and when the rims or tires are being turned, the wheels and their axle function as an integral structure.

When turning the combined wheels and axles, the axles are supported between centers, and each wheel is directly driven by means of a face plate to which it is connected by clamps, which engage the face plate and the rim of the wheel. The face plates are both driven from a common driving shaft by means of a train of gearing, while the common or main driving shaft is driven from a suitable source of power, preferably on electric motor.

Heretofore efforts have been made to overcome chatter by strengthening the parts to overcome elasticity in both frame and driving mechanism. In fact, as far as I am aware, builders have attempted to make the driving mechanism as rigid as possible without providing cumbersome driving mechanism.

I have discovered that it is possible to interpose in the driving mechanism members having resilient capacities whose stiffness will vary with the heaviness of the cuts, so that on relatively light cuts the resiliency will be relatively great, while on heavier cuts the resiliency will be relatively small up to, if desired, a condition of substantial rigidity; and that thereby chatter will be reduced and in many cases eliminated.

I do not desire it to be understood that rigidity of structure can be dispensed with without danger of sacrificing accuracy in the work done by the tool, but I would have it understood that if a resilient member or members of the proper degree of flexibility are interposed in the driving mechanism, chatter will be reduced and in many cases eliminated. This I have fully demonstrated on a ninety-inch locomotive wheel lathe, and found that by the use of my invention I am enabled to materially reduce or substantially eliminate chatter when turning such wheels.

The lathe constructed and operated was the same in all respects as a standard lathe of this type, with the exception that a solid gear in each driving train between the main driving shaft and the face plate was replaced by a spring gear. These spring gears each comprised a hub member and a ring gear or tooth member so arranged that said members moved relative to each other for a predetermined distance in directions concentric to the axis of the gear wheel. Each gear was provided with sets of springs interposed between their two members or elements, which were brought into action at different times, together with abutments which were brought into action after the springs were in action until a predetermined maximum degree of driving power had been reached, after which the gear members acted as a solid gear.

The precise nature of my invention will be best understood by reference to the accompanying drawings, which will now be described, it being premised, however, that changes may be made without departing from the spirit and scope of my invention as defined in the appended claims.

Fig. 4 is a face view of one form of improved resilient gear made in accordance with my invention.

Fig. 5 is a vertical sectional view through the gear shown in Fig. 4.

Figure 1:
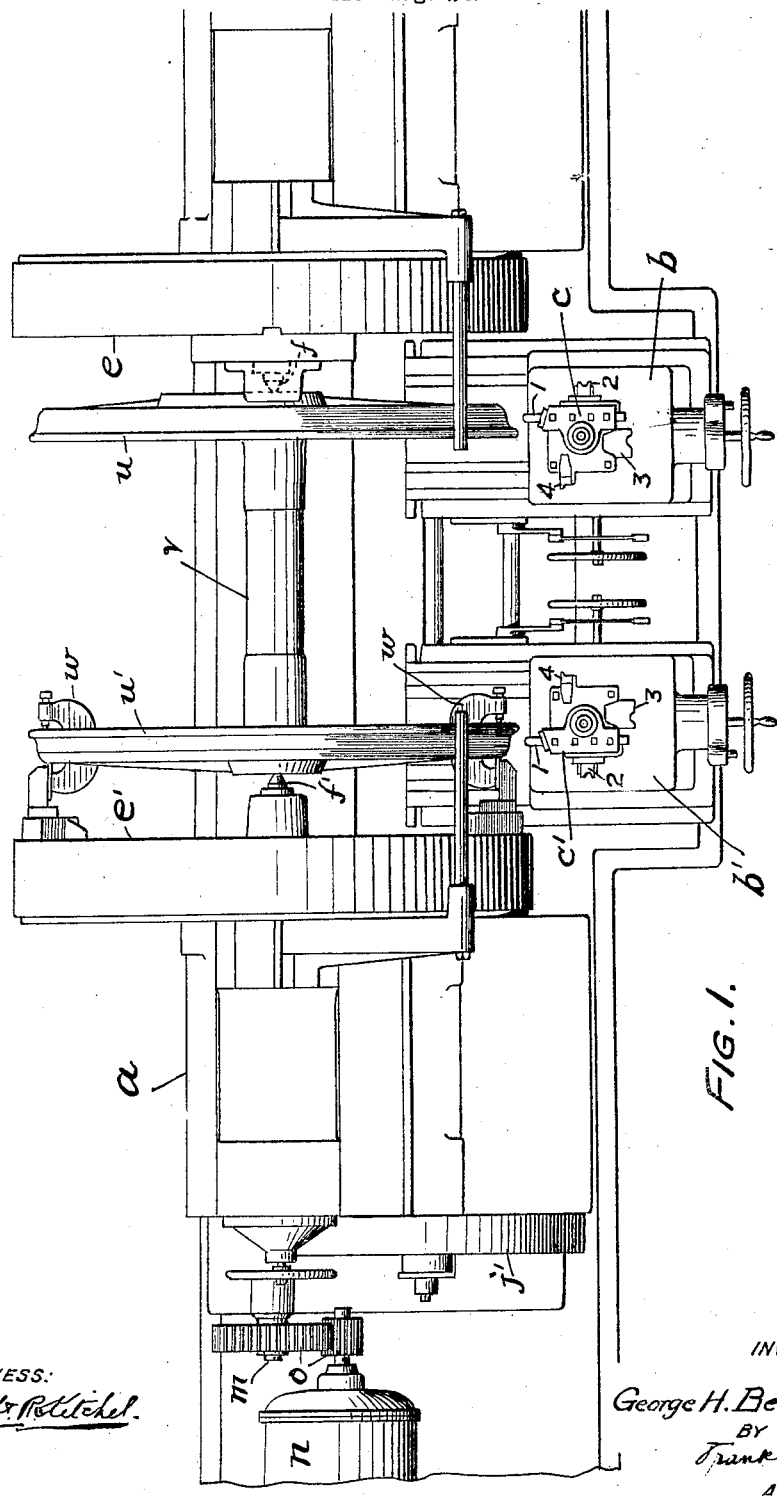
Fig. 1 is a plan view of a portion of a locomotive wheel lathe, to which I have applied one form of my improved drive.

In these drawings, the reference character $a$ designates the frame or bed of the lathe and $b$, $b'$ the tool slides. These tool slides are arranged to move both longitudinally and transversely on suitable guides on the tool carriages and are arranged to be moved either by hand or power, in the usual manner, to shift the slides relative to the work. Mounted on the tool slides are turrets $c$ and $c'$, to which the different tools 1, 2, 3 and 4 for turning the wheels are connected.

Rotatably mounted in bearings on the bed are the hollow spindles $d$ and $d'$ to which are connected in the usual manner face plates $e$ and $e'$, respectively, and in which are also supported the respective centers $f$ and $f'$.

The face plates are provided with internal gears $g$ and $g'$, respectively, which are engaged by pinions $h$ and $h'$ on shafts $i$ and $i'$, respectively. $j$ and $j'$ are gears on the shafts $i$ and $i'$, respectively, at the end opposite the pinions $h$ and $h'$. These gears are provided with springs as hereinafter described and are what will hereinafter be termed spring or resilient gears. The spring gears $j$ and $j'$ are connected to a shaft $k$ through the medium of pinions $l$ and $l'$. This shaft $k$, together with the gearing heretofore described, connect the two face plates to each other so that the face plates are driven in the same direction and at the same speed when so connected.

The lathe is driven from the main shaft $m$, which is driven by a motor $n$ through gearing $o$ (see Fig. 1).

One of the spring gear wheels, for example gear $j$, is shown in detail in Figs. 4 and 5, and comprises a hub member 5 and a tooth member 6. The member 5 is provided with an annular seat formed between an annular flange 7 thereon and a ring 8 bolted thereto by bolts 9. The member 6 is provided with an annular bearing portion 10, which is is arranged to oscillate in the seat on member 5 to a predetermined degree. Formed integral with member 5 are eight lugs 11. 12 are similar lugs on member 6, which are in line with lugs 11. Interconnecting three sets of these lugs are bolts 13. 14 are flanged bushings surrounding the bolts 13, there being two such bushings on each bolt, their flanged ends being adjacent to the lugs.

Interposed between each of the three sets of bolt lugs is a helical spring, which also surrounds its bolt and the bodies of the bushings, and engages, or is adapted to engage, the flanges of the bushings.

Two of these springs are designated by the reference character 15, while the other is designated by the character 16. The first springs 15 are of sufficient length to be under compression between their respective lugs 11 and 12 at all times. The spring 16, however, is somewhat shorter than the distance between its lugs 11 and 12 when the head and nuts on the bolts 13 are in engagement with the lugs. The bodies of the bushings 14 are of such a length as to engage each other after the spring 16 has been compressed a predetermined distance, and before the coils of any of the springs engage each other, and thereby form rigid driving connections between members 5 and 6 of the gear.

In Fig. 1, I have shown locomotive driving wheels $u$ and $u'$ connected to their axle $v$, positioned in the lathe for turning the rims or tires of the wheels. The driving wheels and axle are supported by the centers $f$ and $f'$, and the wheel $u'$ is connected to face plate $g'$ by means of clamps $w'$. The clamps for connecting the wheel $u$ to face plate $f$ are omitted.

The wheels are turned in the usual manner with the roughing tools 1 and 2 and then finished with tools 3 and 4.

Figure 2:
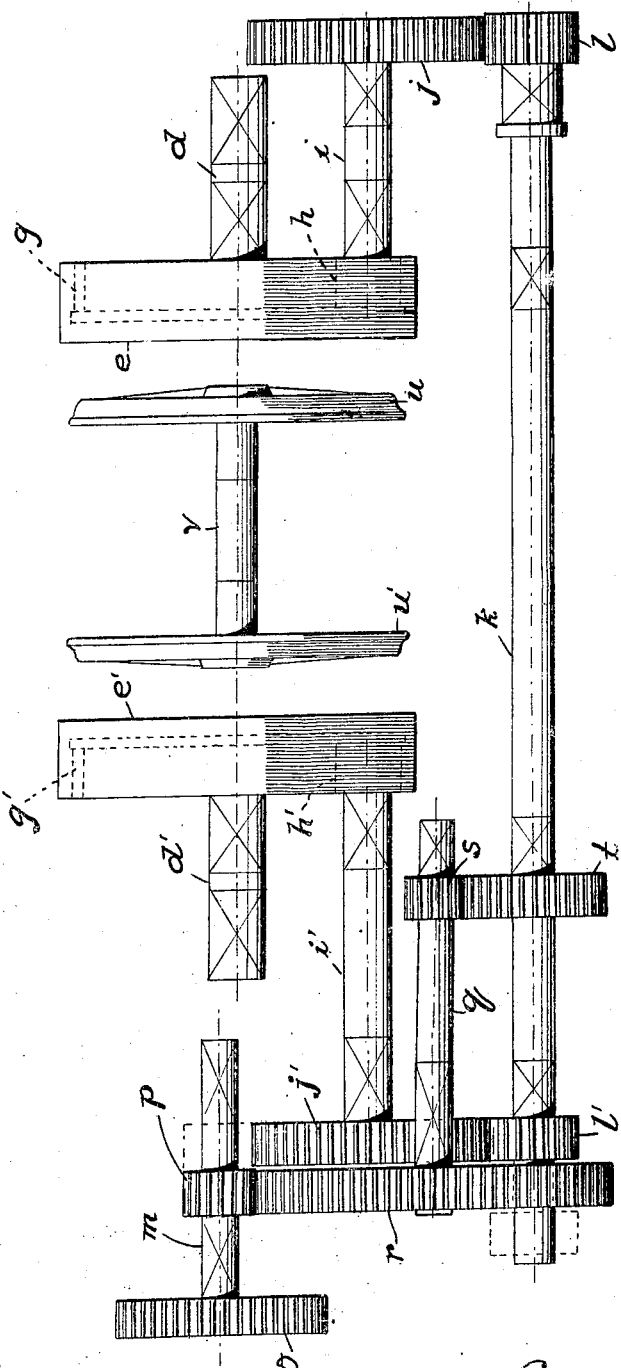
Fig. 2 is a plan view thereof and in which I have merely diagrammatically illustrated the driving mechanism of the lathe shown in Fig. 1.
Figure 3:
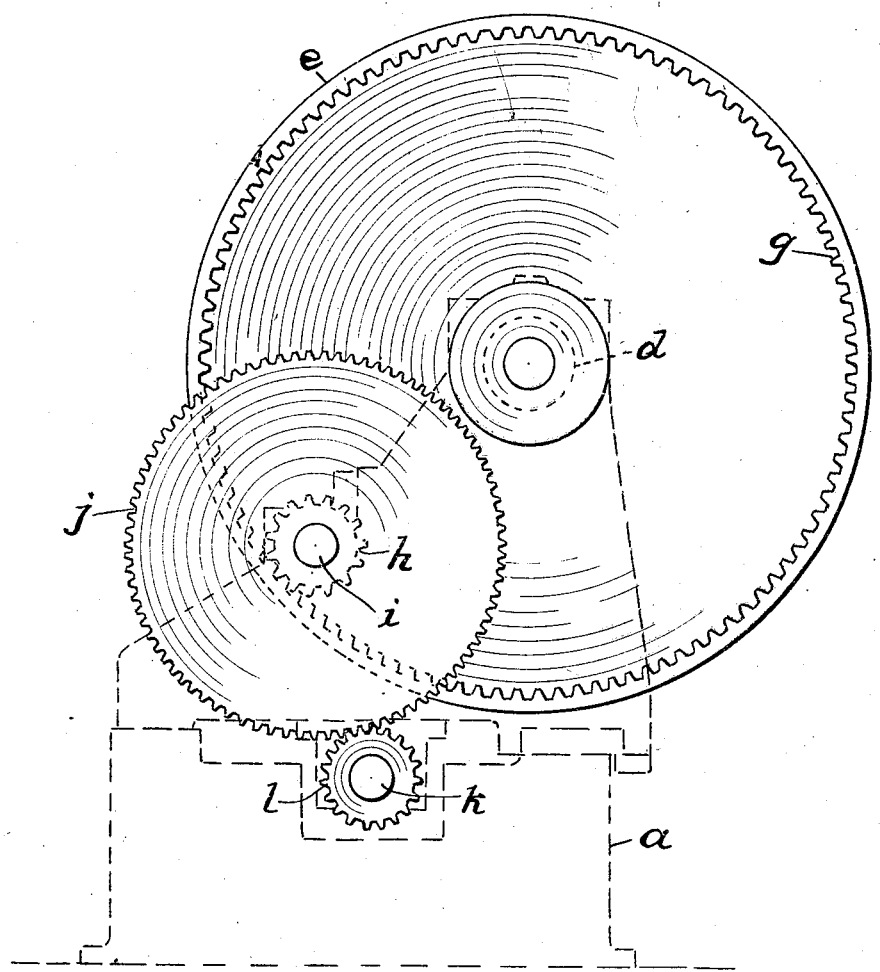
Fig. 3 is an end view of Fig. 2.

When the gearing is arranged as shown in Fig. 2, the face plates are driven through their various gear connections from shaft $k$, which shaft is driven from shaft $m$ through the medium of gears $p$, $r$, $s$ and $t$ and shaft $q$.

Assuming the wheels are set up in the lathe and heavy roughening cuts to be made, the lathe is set into motion and tools 1 or 2 are successively moved into positions to cut. As the tools engage the work, springs 15 on the spring gears will first be compressed and as soon as the lost motion between the springs 16 and their flanged bushings 14 is taken up, said springs will be compressed. When the springs 16 are brought into action, the driving power of shafts $i$ and $i'$ is materially increased and the direction of a curve indicating the driving power would be abruptly changed after the springs 16 are brought into action from their general direction indicating the driving power of springs 15. Springs 15 and 16 are further compressed, gradually increasing the driving power until the slack between the different sets of bushings 14 is taken up, and when this occurs, the gear $j$ and $j'$ will drive as solid gears.

When making light or finishing cuts, springs 15 alone are under compression, or springs 15 and 16 are both under compression, the compression of the springs varying in proportion to the load.

In this case I have shown resilient or spring gear wheels having two stages of resistances, which might be increased to any number of stages. This is an advantage as it provides automatic adjustment of the resilient drive for varying loads, which will vary in wheels of different diameters and width of cutters for the same depth of cut. This stepping up also avoids shock when the bushings contact to form a rigid drive, as the last step may be very stiff so as to avoid shock when the bushings 14 contact to form a rigid drive.

The advantages of my invention result from the provision of a driving gear for machine tools, whereby I am enabled to constantly maintain the tool to its work or prevent back-lash between the driving work piece or tool and the driving shaft by always maintaining the driving gear under tension between the load and the point of application of power, and thereby substantially prevent chatter; and further, from the provision of resilient driving means of stepped form between the load and point of application of power whereby the power delivered therethrough varies when passing from one step or stage to the next, so that the drive automatically adjusts itself to varying loads, and also thereby avoids shock when passing from a resilient drive to a rigid drive, and at the same time provides a relatively sensitive drive when compared to the stiffness of the drive just before the drive passes from a resilient to a rigid drive.

Having now fully described my invention, what I claim and desire to protect by Letters Patent is:

1. A wheel lathe having face plates, means for supporting an axle with wheels thereon between the face plates, means for securing the wheels to the face plates respectively, a main driving shaft, means actuated from the main driving shaft for driving the face plates respectively, and means included in the driving means adapted, when one face plate tends to drive the other through a supported axle, to maintain the means for driving the latter face plate in driving relation irrespective of the driving effect of the main driving shaft.

2. A wheel lathe having two face plates, a shaft for driving each face plate, a main driving shaft, sets of gears connecting the main driving shaft to the face plate driving shafts, and springs of different strength interposed in the gearing between each plate driving shaft and the main driving shaft adapted to maintain the gearing between the face plate driving shafts and the main shaft in driving relation irrespective of differential driving effort on the sets of gears.

3. A wheel lathe having face plates, means for supporting an axle with wheels thereon between the face plates, means for securing each wheel to a face plate, a driving shaft and each face plate, a common driving shaft and sets of gearing affording driving connections between each of the face plate driving shafts and the main driving shaft, one of the gears of each set being a spring gear provided with springs of different strength, whereby when the one face plate tends to drive the other through a supported axle the set of gears affording connection the latter face plate and the main driving shaft will be maintained in driving relation irrespective of the driving effort of the main shaft.

4. A wheel lathe having face plates rotatable about a common axis, means for supporting an axle with wheels thereon between the face plates, means for securing each wheel to a face plate, a shaft for driving each face plate, gearing connecting each face plate with its shaft, a main driving shaft, a set of gears for connecting each face plate driving shaft with the main shaft, one gear of each set having a hub member connected to the driving shaft, and a tooth member connected to the gear of its set on the face plate driving shaft, and compression springs of different strength between the members of the gears.

5. A wheel lathe having face plates rotatable about a common axis, means for supporting an axle with wheels thereon between the face plates, means for securing each wheel to a face plate, a shaft for driving each face plate, gearing connecting each face plate with its shaft, a main driving shaft, a set of gears for connecting each face plate driving shaft with the main shaft, one gear of each set having a hub member connected to the driving shaft and a tooth member connected to the gear of its set on the face plate driving shaft, springs of different strength between the hub member and the tooth member of each of said gears, one spring being arranged to come into action after another of said springs has been in action to materially increase the driving power when said last spring is brought into action, and abutments on the hub member and tooth member arranged to engage each other to form a rigid drive after the last spring to be brought into action has acted to a predetermined degree, whereby there is an irregular step-up in drive from the minimum resilient drive to the rigid drive.

6. A wheel lathe having face plates rotatable about a common axis, means for supporting an axle with wheels thereon between the face plates, means for securing each wheel to a face plate, a shaft for driving each face plate, gearing connecting each face plate with its shaft, a main driving shaft, a set of gears for connecting each face plate driving shaft with the main shaft, one gear of each set having a hub member connected to the driving shaft and a tooth member connected to the gear of its set on the face plate driving shaft, and springs of different strength between the two members of each set of gears arranged to be brought into action at different times during the movement of one member relative to the other member to step up the driving power of the gearing as successive springs are brought into action.

7. Driving mechanism for machine tools, comprising a member at one end of said mechanism for moving the work and tool relatively to each other, means for applying power to the other end of said mechanism, and a plurality of resilient elements of different strength in said driving mechanism, said elements being progressively compressible the weakest first as the heaviness of the cuts increases.

3. A lathe having two face plates, a shaft for driving each face plate, a main driving shaft, gearing connecting the main driving shaft to the face plate driving shafts, and spring means interposed in the gearing between each face plate driving shaft and the main driving shaft to permit relative movement between the two face plates.

In testimony of which invention, I have hereunto set my hand, at Philadelphia, Pa, on this 23rd day of August, 1922.

GEO. H. BENZON, Jr.